United States Patent
Horikawa et al.

(10) Patent No.: US 12,014,459 B2
(45) Date of Patent: Jun. 18, 2024

(54) IMAGE PROCESSING DEVICE, IMAGE PROCESSING METHOD, AND PROGRAM FOR FORMING AN ACCURATE THREE-DIMENSIONAL MAP

(71) Applicant: SONY INTERACTIVE ENTERTAINMENT INC., Tokyo (JP)

(72) Inventors: Tsutomu Horikawa, Tokyo (JP); Daichi Ono, Tokyo (JP); Hiroyuki Yabe, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 17 days.

(21) Appl. No.: 17/635,951

(22) PCT Filed: Sep. 12, 2019

(86) PCT No.: PCT/JP2019/035972
§ 371 (c)(1),
(2) Date: Feb. 16, 2022

(87) PCT Pub. No.: WO2021/048985
PCT Pub. Date: Mar. 18, 2021

(65) Prior Publication Data
US 2022/0335681 A1    Oct. 20, 2022

(51) Int. Cl.
*G06T 15/20* (2011.01)
*G06T 7/70* (2017.01)

(52) U.S. Cl.
CPC .............. *G06T 15/205* (2013.01); *G06T 7/70* (2017.01)

(58) Field of Classification Search
None
See application file for complete search history.

(56) References Cited

U.S. PATENT DOCUMENTS

2005/0213807 A1* 9/2005 Wasserman ........... G06T 7/0004
382/152
2012/0194516 A1* 8/2012 Newcombe ............. G06T 17/00
345/420
(Continued)

FOREIGN PATENT DOCUMENTS

| JP | H0618221 A | 1/1994 |
|----|----|----|
| JP | 2019028861 A | 2/2019 |

(Continued)

OTHER PUBLICATIONS

International Search Report and Written Opinion mailed Oct. 15, 2019, from PCT/JP2019/035972, 11 sheets.

(Continued)

*Primary Examiner* — Anh-Tuan V Nguyen
(74) *Attorney, Agent, or Firm* — XSENSUS LLP

(57) ABSTRACT

Provided are an image processing device, an image processing method, and a program capable of forming an accurate three-dimensional map even in a case where a moving object is included in an input image. The image processing device includes an image acquiring section that sequentially acquires two-dimensional captured images, an object type recognition executing section that attaches, to each pixel in the sequentially acquired captured images, a label indicating the type of an object represented by the pixel, and a three-dimensional map creating section that executes three-dimensional position recognition of each pixel of the captured images to create a three-dimensional map, on the basis of the sequentially acquired captured images, and the three-dimensional map creating section restricts the three-dimensional position recognition of each pixel of the captured images according to the label attached to the pixel.

15 Claims, 3 Drawing Sheets

(56) References Cited

U.S. PATENT DOCUMENTS

| | | | |
|---|---|---|---|
| 2014/0270706 A1* | 9/2014 | Pasko | H04N 21/854 |
| | | | 386/278 |
| 2017/0316333 A1* | 11/2017 | Levinson | G01S 17/87 |
| 2018/0161986 A1* | 6/2018 | Kee | G06V 20/10 |
| 2018/0259966 A1* | 9/2018 | Long | G06F 18/24 |
| 2018/0336421 A1* | 11/2018 | Huang | G05D 1/0246 |
| 2019/0051056 A1* | 2/2019 | Chiu | G06F 16/903 |
| 2019/0080462 A1* | 3/2019 | Jung | G06V 20/64 |
| 2019/0222776 A1* | 7/2019 | Carter | H04N 5/272 |
| 2019/0286915 A1* | 9/2019 | Patil | G05D 1/0246 |
| 2020/0162657 A1* | 5/2020 | Kobayashi | H04N 1/2112 |
| 2020/0184231 A1* | 6/2020 | Viswanathan | G06V 30/19173 |
| 2020/0372285 A1* | 11/2020 | Adams | G06N 3/084 |
| 2020/0372710 A1* | 11/2020 | Wang | B33Y 50/00 |
| 2022/0012896 A1* | 1/2022 | Bond | G06T 19/006 |

FOREIGN PATENT DOCUMENTS

| | | |
|---|---|---|
| JP | 2019134428 A | 8/2019 |
| WO | 2015/111283 A1 | 7/2015 |

OTHER PUBLICATIONS

Martin Runz, et al., Co-Fusion: Real-time Segmentation, Tracking and Fusion of Multiple Objects, 2017 IEEE International Conference on Robotics and Automation, 2017, pp. 4471-4478.
Tateno, Keisuke et al., CNN-SLAM: Real-time dense monocular SLAM with learned depth prediction, 2017 IEEE Conference on Computer Vision and Pattern Recognition, 2017, pp. 6565-6574.
Office Action dated Aug. 9, 2022, from Japanese Application No. 2021-545056, 5 sheets.

* cited by examiner

F I G . 2
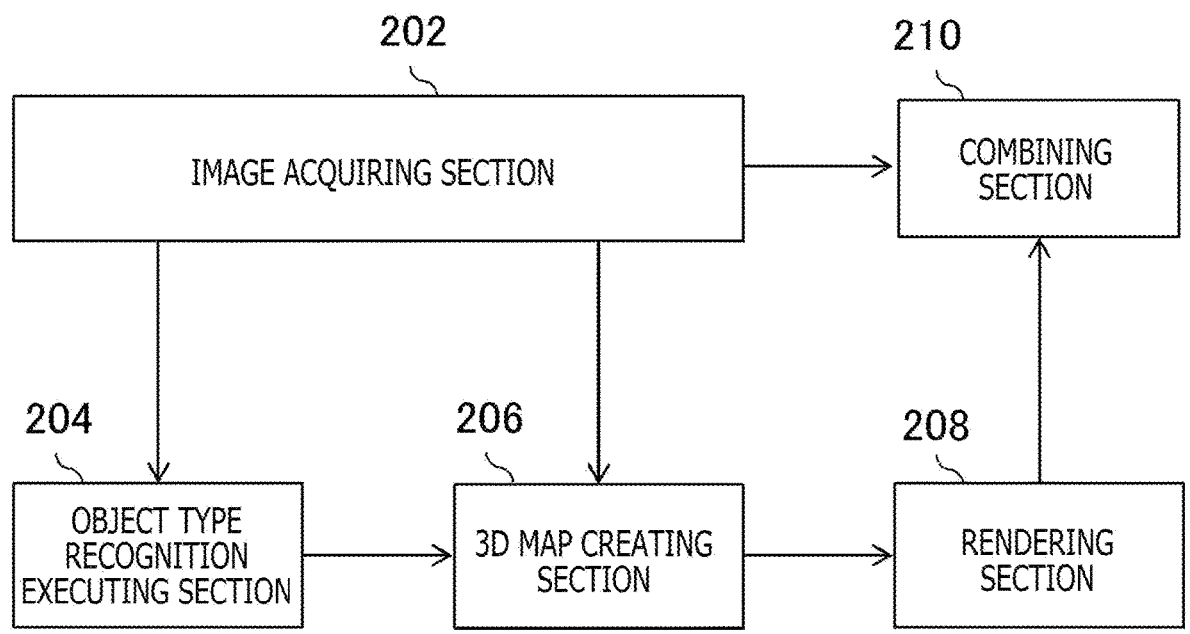

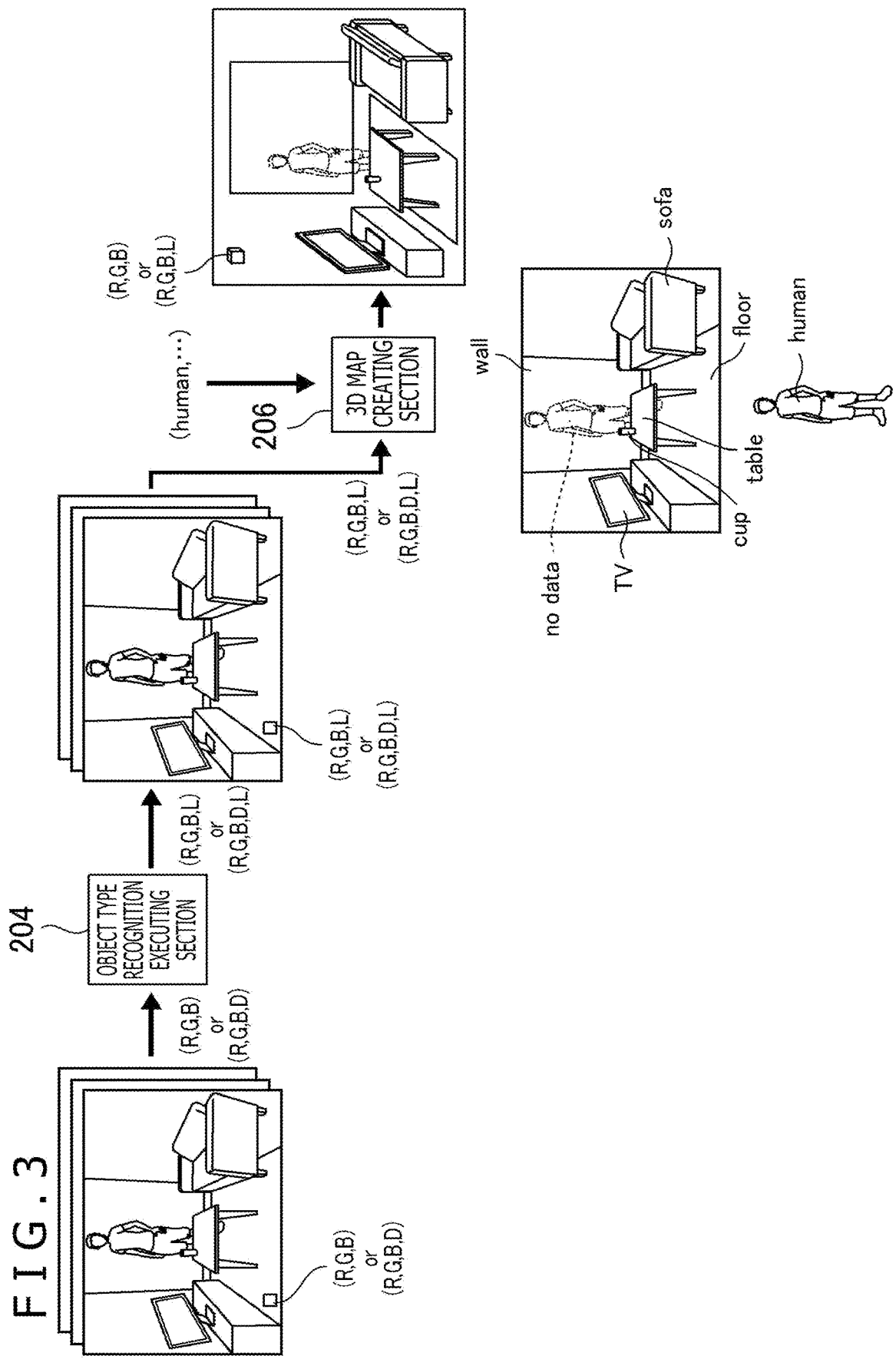

IMAGE PROCESSING DEVICE, IMAGE PROCESSING METHOD, AND PROGRAM FOR FORMING AN ACCURATE THREE-DIMENSIONAL MAP

TECHNICAL FIELD

The present invention relates to an image processing device, an image processing method, and a program.

BACKGROUND ART

The technology (what is called SLAM: Simultaneous Localization and Mapping) that forms a three-dimensional map by simultaneously executing self-position estimation and three-dimensional position recognition of an object represented in an input image on the basis of the input image has been known.

In addition, an object type recognition technology (what is called semantic segmentation) is known which recognizes the type of an object such as a person, a road, or the sky represented by the pixel for each pixel of an input image and attaches a label indicating the type to each pixel. The object type recognition is performed using a machine learning model that has learned using learning data.

SUMMARY

Technical Problems

The technique of forming a three-dimensional map by simultaneously executing self-position estimation and three-dimensional position recognition of an object represented in an input image is based on the premise that the object represented in the input image is stationary. Therefore, in a case where the object represented in the input image includes a moving object (the position, posture, shape, etc. change with time) such as a person or an animal, the three-dimensional map cannot be formed correctly. Further, even if the object represented in the input image is a stationary object such as a cup, the three-dimensional map needs to be recreated in a case where the cup is moved after forming the three-dimensional map.

The present invention has been made in view of the above problems, and an object thereof is to provide an image processing device, an image processing method, and a program capable of accurately forming a three-dimensional map even in a case where a moving object is included in the input image.

Solution to Problems

In order to solve the above problems, the image processing device according to the present invention includes an image acquiring section that sequentially acquires a two-dimensional captured image, an object type recognition executing section that attaches, to each pixel of the sequentially acquired captured image, a label indicating a type of an object represented by the pixel, and a three-dimensional map creating section that creates a three-dimensional map by executing three-dimensional position recognition of each pixel of the captured image on the basis of the sequentially acquired captured image, and is characterized in that the three-dimensional map creating section restricts the three-dimensional position recognition of each pixel of the captured image according to the label attached to the pixel.

One aspect of the present invention is characterized in that the three-dimensional map creating section restricts the three-dimensional position recognition of the pixel in a case where the label attached to the pixel indicates a type of a moving object.

One aspect of the present invention is characterized in that the three-dimensional map creating section divides the captured image into a plurality of regions on the basis of the label attached to each pixel of the captured image, and executes, for each region, three-dimensional position recognition of the pixel included in the region.

One aspect of the present invention is characterized in that the three-dimensional map creating section creates the three-dimensional map by combining three-dimensional position recognition results for respective regions.

One aspect of the present invention is characterized by further including a rendering section that creates a two-dimensional image by rendering the three-dimensional map with an image capturing position of the captured image as a viewpoint, and a combining section that combines the pixel of the captured image whose three-dimensional position recognition is restricted, with the two-dimensional image.

One aspect of the present invention is characterized in that the three-dimensional map creating section further restricts the three-dimensional position recognition by using a weight coefficient preset according to the label.

The image processing method according to the present invention includes an image acquiring step of sequentially acquiring a two-dimensional captured image, an object type recognition executing step of attaching, to each pixel of the sequentially acquired captured image, a label indicating the type of an object represented by the pixel, and a three-dimensional map creating step of creating a three-dimensional map by executing three-dimensional position recognition of each pixel of the captured image, on the basis of the sequentially acquired captured image, and is characterized in that the three-dimensional map creating step includes restricting the three-dimensional position recognition of each pixel of the captured image according to the label attached to the pixel.

The program according to the present invention is a program causing a computer to execute an image acquiring procedure for sequentially acquiring a two-dimensional captured image, an object type recognition executing procedure for attaching, to each pixel of the sequentially acquired captured image, a label indicating the type of an object represented by the pixel, a three-dimensional map creating procedure for creating a three-dimensional map by executing three-dimensional position recognition of each pixel of the captured image on the basis of the sequentially acquired captured image, and is characterized in that three-dimensional map creating procedure includes restricting the three-dimensional position recognition of each pixel of the captured image according to the label attached to the pixel.

BRIEF DESCRIPTION OF DRAWINGS

FIG. 2 is a functional block diagram illustrating an example of functions implemented in the image processing device according to the embodiment of the present invention.

FIG. 3 is a diagram illustrating an example of a flow of image processing performed by the image processing device according to the embodiment of the present invention.

DESCRIPTION OF EMBODIMENT

Figure 1:
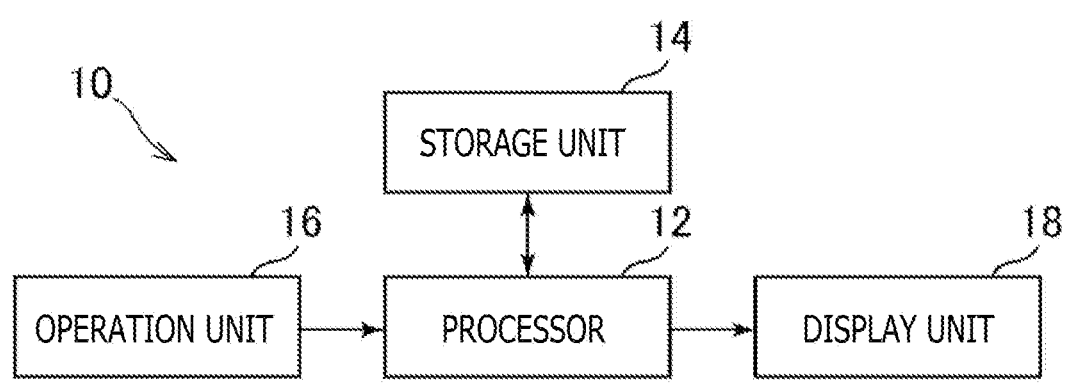
FIG. 1 is a configuration diagram of an image processing device according to an embodiment of the present invention.

Hereinafter, an embodiment of the present invention will be described in detail with reference to the drawings. FIG. 1 is a configuration diagram of an image processing device 10 according to the present embodiment.

The image processing device 10 according to the present embodiment is a computer such as a game console or a personal computer. Further, the image processing device 10 may be an image capturing device such as a digital camera. As illustrated in FIG. 1, the image processing device 10 according to the present embodiment includes a processor 12, a storage unit 14, an operation unit 16, and a display unit 18, for example.

The processor 12 is a program control device such as a central processing unit (CPU) that operates according to a program installed in the image processing device 10, for example.

The storage unit 14 is a storage element such as a read-only memory (ROM) or a random access memory (RAM), a hard disk drive, or the like. The storage unit 14 stores a program or the like executed by the processor 12.

The operation unit 16 is a user interface such as a keyboard, a mouse, and a controller of a game console, and receives an operation input of the user, and then outputs a signal indicating the contents to the processor 12.

The display unit 18 is a display device such as a liquid crystal display, and displays various images in accordance with the instructions of the processor 12.

Incidentally, the image processing device 10 may include a communication interface such as a network board, an optical disk drive for reading an optical disk such as a digital versatile disk (DVD)-ROM or a Blu-ray (registered trademark) disk, a universal serial bus (USB) port, and the like.

Next, the functions of the image processing device 10 according to the present embodiment and the processing executed by the image processing device 10 will be further described.

As illustrated in FIG. 2, the image processing device 10 according to the present embodiment functionally includes an image acquiring section 202, an object type recognition executing section 204, a three-dimensional map creating section 206, a rendering section 208, and a combining section 210, for example. The above elements are mainly implemented in the processor 12 and the storage unit 14.

The image acquiring section 202 sequentially acquires two-dimensional captured images. To be specific, for example, the image acquiring section 202 sequentially acquires a still image of each frame included in a moving image captured by a general video camera. Here, the still image is a two-dimensional image including gradation information of each color of red, green, and blue, for example. Further, the position and direction of the video camera that captures the input image changes with time. Therefore, the image acquiring section 202 acquires a two-dimensional image taken while the viewpoint and the angle of view are continuously changed with time.

Note that the image acquiring section 202 may acquire depth information together with the captured image. To be specific, for example, the image acquiring section 202 may acquire, from a distance measuring sensor arranged near the lens of the video camera, the distance between the object represented at each pixel and the lens, as the depth information corresponding to each pixel of the input image. Further, for example, the image acquiring section 202 may acquire a two-dimensional image including depth information of each pixel together with gradation information of each color of red, green, and blue, on the basis of two captured images captured by a twin-lens video camera.

The object type recognition executing section 204 attaches, to each pixel of the sequentially acquired captured images, a label indicating the type of the object represented by the pixel. To be specific, for example, the object type recognition executing section 204 is a machine learning model implemented by a convolutional neural network (CNN). Each time the image acquiring section 202 acquires an input image of one frame, the object type recognition executing section 204 executes semantic segmentation for the input image on the basis of the gradation information included in the input image. As a result, to each pixel of the acquired input image, a label indicating the type of the object represented by the pixel is attached for each frame. Labels are, for example, "human" representing a person, "table" representing a table, "sofa" representing a sofa, "cup" representing a cup, "floor" representing a floor, "wall" representing a wall, and the like.

The three-dimensional map creating section 206 creates a three-dimensional map by executing three-dimensional position recognition of each pixel of the captured image on the basis of the sequentially acquired captured images. Specifically, for example, the three-dimensional map creating section 206 executes visual SLAM on the basis of the input images sequentially acquired by the image acquiring section 202. The three-dimensional map creating section 206 can simultaneously estimate the three-dimensional information of the environment whose image is captured by the camera and the position and posture of the camera from the two-dimensional image captured by the camera. As a result, the three-dimensional map creating section 206 can create a three-dimensional map.

It should be noted that the three-dimensional map creating section 206 may create a three-dimensional map by performing three-dimensional position recognition using the position information acquired from a global positioning system (GPS) (not illustrated) and the depth information acquired by the image acquiring section 202.

Here, the three-dimensional map creating section 206 restricts the three-dimensional position recognition of each pixel of the captured image according to the label attached to the pixel. Specifically, the three-dimensional map creating section 206 restricts the three-dimensional position recognition of the pixel in a case where the label attached to the pixel indicates a type of a moving object. For example, it is assumed that any of "human" representing a person, "cup" representing a cup, "TV" representing a television, "table" representing a table, "sofa" representing a sofa, "floor" representing a floor, and "wall" representing a wall is attached to each pixel contained in one captured image. In this case, the three-dimensional map creating section 206 restricts the three-dimensional position recognition of the pixel labeled "human" indicating a type of a moving object. That is, the three-dimensional map creating section 206 creates a three-dimensional map using only pixels with labels representing "cup," "TV," "table," "sofa," "floor," and "wall" among a plurality of pixels included in the acquired captured image. Due to this, a three-dimensional map including voxels corresponding to positions other than the position where a person as a moving object is present in the real space is created. The voxels corresponding to the position where the person is present are not included in the three-dimensional map.

Note that, in the above, the case where the type of the moving object is only "human" has been described, but the type of the moving object may be set appropriately. To be specific, for example, since a cup is an object to be frequently moved by a person, "human" and "cup" may be set as the types of moving objects. Also, for example, since all objects other than the floor and walls can be moved, "human," "cup," "TV," "table," and "sofa" may be set as the types of moving objects.

Further, the three-dimensional map creating section 206 may divide the captured image into a plurality of regions on the basis of the label attached to each pixel of the captured image, to execute three-dimensional position recognition of the pixels included in the region for each region. To be specific, in the above example, the three-dimensional map creating section 206 divides the captured image into a region in which the label "human" is attached to pixels and a region in which the labels "cup," "TV," "table," "sofa," "floor," and "wall" are attached to pixels. Then, the three-dimensional map creating section 206 executes the three-dimensional position recognition by using only the pixels labeled "cup," "TV," "table," "sofa," "floor," and "wall." Further, the three-dimensional map creating section 206 executes the three-dimensional position recognition by using only the pixels labeled "human." Then, the three-dimensional map creating section 206 may create a three-dimensional map by combining the three-dimensional position recognition results for respective regions. This makes it possible to create a three-dimensional map including voxels corresponding to the position where the person is present.

It should be noted that the three-dimensional map creating section 206 can create a three-dimensional map by combining the three-dimensional position recognition results for respective regions only in a situation where the person does not move. Therefore, when the person moves, the three-dimensional map creating section 206 stops combining the three-dimensional position recognition results for respective regions, and uses only the pixels to which labels other than the label indicating the type of the moving object are attached, to create a three-dimensional map. Then, when the movement of the person stops, the three-dimensional position recognition for the pixel to which a label indicating the type of the moving object is attached is restarted, and the three-dimensional map in which the three-dimensional position recognition results for respective regions are combined can be created again.

The rendering section 208 creates a two-dimensional image by rendering a three-dimensional map with the image capturing position of the captured image as the viewpoint. Specifically, for example, the image acquiring section 202 sequentially acquires a two-dimensional captured image for each frame. At this time, since the imaging device such as a video camera moves with time, the viewpoint at the time of image capturing changes frame by frame. The rendering section 208 renders the three-dimensional map by setting the image capturing position of the captured image in the current frame as the viewpoint.

The combining section 210 combines the pixels of the captured image for which the three-dimensional position recognition is restricted, with the two-dimensional image created by the rendering section 208. To be specific, as in the above example, it is assumed that the rendering section 208 creates a two-dimensional image by setting the image capturing position of the captured image in the current frame as the viewpoint, with respect to the three-dimensional map created by using only pixels labeled "cup," "TV," "table," "sofa," "floor," and "wall." Since the three-dimensional map does not include the voxels corresponding to the pixels labeled "human," the created two-dimensional image does not include the gradation information in the region where the person is represented. On the other hand, all the pixels of the captured image acquired by the image acquiring section 202 include gradation information. Therefore, among the pixels of the captured image, the pixel representing a person includes gradation information. The combining section 210 combines the gradation information of pixels which are labeled to represent the person among the pixels of the captured image of the current frame with the two-dimensional image that does not include gradation information in the region where the person is represented. As a result, while a three-dimensional map is created with high accuracy, the two-dimensional image created from the three-dimensional map and the moving object that does not exist in the three-dimensional map due to the restriction of three-dimensional position recognition can be displayed in an overlapping manner.

Incidentally, in a case where the three-dimensional map creating section 206 divides the captured image into a plurality of regions and executes the three-dimensional position recognition of the pixels included in the region for each region, the two-dimensional image created by rendering from the three-dimensional map includes both an object to which a label indicating the type of the moving object is given and an object to which a label other than this is given. In this case, the image processing device 10 may have a configuration not including the combining section 210.

The above functions may be implemented by executing, on the processor 12, a program that is installed in the image processing device 10 which is a computer and that includes the instructions corresponding to the above functions. This program may be supplied to the image processing device 10 via a computer-readable information storage medium such as an optical disk, a magnetic disk, a magnetic tape, a magneto-optical disk, or a flash memory, or via the Internet or the like, for example.

In the present embodiment, for example, a three-dimensional map is created on the basis of a two-dimensional image captured by a general video camera. Hereinafter, a method of creating a three-dimensional map will be described with reference to FIG. 3.

First, the two-dimensional input images sequentially acquired by the image acquiring section 202 frame by frame are input to the object type recognition executing section 204. Specifically, for example, a two-dimensional input image captured by a twin-lens video camera is sequentially input to the object recognition executing section for each frame. Here, for example, each pixel of the input image includes gradation information representing red, green, and blue, and depth information representing the distance from the video camera.

The object type recognition executing section 204 attaches, to each pixel of the input images acquired frame by frame, a label indicating the type of the object represented by the pixel. Specifically, the object type recognition executing section 204 determines the type of the object represented by the pixel, on the basis of the gradation information of each pixel of the input two-dimensional input image. Then, the object type recognition executing section 204 attaches a label indicating the determined object type to each pixel of the input image. For example, in a case of determining that the object represented by a certain pixel is a person, the object type recognition executing section 204 labels the pixel as "human." Further, for example, in a case of determining that the object represented by a certain pixel is a wall surface, the object type recognition executing section 204 labels the pixel as "wall." Therefore, each pixel of the image output by the object type recognition executing section 204 includes information representing a label in addition to the gradation information and the depth information.

Next, the output images are sequentially input to the three-dimensional map creating section 206 frame by frame, and the three-dimensional map is created. To be specific, as described above, a two-dimensional image in which each pixel includes gradation information, depth information, and information representing a label is input to the three-dimensional map creating section 206. The three-dimensional map creating section 206 creates a three-dimensional map by executing three-dimensional position recognition of the object represented by the input image, on the basis of the gradation information and the depth information of the input image sequentially input.

Here, the three-dimensional map creating section 206 restricts the three-dimensional position recognition of each pixel of the captured image according to the label attached to the pixel. In the example of FIG. 3, the three-dimensional map creating section 206 acquires the label "human" as a label which is a target of restriction. Then, the three-dimensional map creating section 206 divides the image with respective labels into a region labeled "human" and a region labeled "cup," "TV," "table," "sofa," "floor," and "wall" (see the lower side of the three-dimensional map creating section 206 in FIG. 3). Then, the three-dimensional map creating section 206 executes the three-dimensional position recognition by using only the pixels labeled "cup," "TV," "table," "sofa," "floor," and "wall."

By executing the SLAM only for the stationary objects, the three-dimensional map creating section 206 can accurately form the three-dimensional map even in a case where the input image includes a moving object. Further, as time elapses, while the moving object in the input image changes its position, the image acquiring section 202 acquires the input images captured from different viewpoints. As a result, the three-dimensional map creating section 206 can create a three-dimensional map including the voxels of the region that is missing because the region is in the back of a moving object in the three-dimensional map of FIG. 3.

The three-dimensional map created as described above can be applied to augmented reality (AR) technology, for example. In a case where a three-dimensional map of the inside of a room in which a table, a TV, a sofa, etc. are arranged is created, the user can experience a virtual space reflecting the real world room while staying in the real world room. At this time, there is no need to move a person out of the room, or to clean up small items such as cups or moving objects for capturing images, and the user can more easily create a highly accurate three-dimensional map.

It should be noted that the present invention is not limited to the above-described embodiment. Further, the specific character strings and numerical values mentioned above and also in the drawings are examples, and the present invention is not limited to those.

For example, the three-dimensional map creating section 206 may further restrict the three-dimensional position recognition by using a weight coefficient preset according to the label. To be specific, when the input image of the nth frame is input, the three-dimensional map creating section 206 extracts respective feature points from the three-dimensional map created in the (n−1)th frame and the input image of the nth frame. The three-dimensional map creating section 206 executes the position recognition of the input image such that the total error of the feature points is minimized.

Here, the three-dimensional map creating section 206 may multiply the error of the feature point by a weight coefficient for each feature point. The weight coefficient for the multiplication is preset for the label attached to the pixel in which the feature point appears.

As the object whose type is indicated by a label is more likely to be moved, the preset weight coefficient for the label is set to a smaller value. To be specific, for example, a weight coefficient of "1.0" is set for the labels "floor" and "wall." A weight coefficient of "0.5" is set for the labels "table," "TV," and "sofa." A weight coefficient of "0.1" is set for the label "cup." A weight coefficient of "0.0" is set for the label "human."

In this case, since the error of the feature point obtained after multiplication of the weight coefficient of "0.0" is "0.0," the error of the feature point is excluded from the calculation target when the three-dimensional map creating section 206 recognizes the position. The error of the feature point obtained by multiplication of the weight coefficients of "0.1," "0.5," and "1.0" differs in the magnitude of the influence on the total error depending on the coefficient. As a result, such magnitude of the influence on the three-dimensional position recognition can be changed for each feature point depending on the degree of probability that the object moves.

The weight coefficient is appropriately set according to the image capturing environment and intended use. Therefore, it is possible to reduce the adverse effect of objects whose probability of movement is low but not zero (objects represented by "table," "TV," and "sofa" in the above example) on the accuracy of three-dimensional position recognition. On the other hand, an object that has a high probability of movement (an object represented by "cup" in the above example) can also be used as a feature point as needed.

The invention claimed is:

1. An image processing device comprising:
   a memory; and
   processing circuitry coupled to the memory and configured to:
   sequentially acquire a two-dimensional captured image;
   attach, to each pixel of the sequentially acquired captured image, a label indicating a type of an object represented by each pixel, the label identifying the type of the object as being one of a first category and a second category;
   divide the sequentially acquired captured image into a plurality of regions; and
   create a three-dimensional map by executing three-dimensional position recognition for regions of the sequentially acquired captured image that include only pixels with labels indicating the type of the object as being of the second category,
   wherein three-dimensional position recognition is not performed on regions of the sequentially acquired captured image including pixels with labels indicating the type of the object as being of the first category, and
   the processing circuitry is further configured to
   create a two-dimensional image by rendering the three-dimensional map with an image capturing position of the sequentially acquired captured image as a viewpoint; and
   combine pixels of the captured image whose three-dimensional position recognition is restricted, with the two-dimensional image.

2. The image processing device according to claim 1, wherein the processing circuitry restricts the three-dimensional position recognition of a pixel in a case where a label attached to the pixel indicates a type of a moving object.

3. The image processing device according to claim 1, wherein the processing circuitry divides the sequentially acquired captured image into the plurality of regions on a basis of the label attached to each pixel of the sequentially acquired captured image, and executes, for each region and depending on labels attached to pixels in the region, three-dimensional position recognition of the pixels included in the region.

4. The image processing device according to claim 3, wherein the processing circuitry creates the three-dimensional map by combining three-dimensional position recognition results for respective regions.

5. The image processing device according to claim 1, wherein the processing circuitry restricts the three-dimensional position recognition by using a weight coefficient preset according to the label.

6. The image processing device according to claim 1, wherein to attached the label indicating the type of the object, the processing circuitry is further configured to recognize the object via machine learning.

7. The image processing device according to claim 1, wherein the machine learning is performed by the processing circuitry using a convolutional neural network.

8. The image processing device according to claim 7, wherein the processing circuitry is configured to recognize the object based on gradation information corresponding to each pixel.

9. The image processing device according to claim 1, wherein the first category includes moving objects and the second category includes stationary objects.

10. The image processing device according to claim 9, wherein the first category includes a human and the second category includes at least one of a television, a table, a sofa, a cup, and a floor.

11. The image processing device according to claim 10, wherein the processing circuitry is configured to perform the three-dimensional position recognition on a region including pixels corresponding to a human only if the human does not move.

12. The image processing device according to claim 1, wherein the processing circuitry is further configured to use global positioning information to create the three dimensional map.

13. The image processing device according to claim 1, wherein the three-dimensional position recognition performed by the processing circuitry is simultaneous localization and mapping (SLAM).

14. An image processing method comprising:
sequentially acquiring, by processing circuitry, a two-dimensional captured image;
attaching, by the processing circuitry and to each pixel of the sequentially acquired captured image, a label indicating a type of an object represented by the pixel, the label identifying the type of the object as being one of a first category and a second category;
dividing, by the processing circuitry, the sequentially acquired captured image into a plurality of regions; and
creating, by the processing circuitry, a three-dimensional map by executing three-dimensional position recognition for regions of the sequentially acquired captured image that include only pixels with labels indicating the type of the object as being of the second category, the three-dimensional position recognition not being performed on regions of the sequentially acquired captured image including pixels with labels indicating the type of the object as being of the first category,
wherein the method further includes
creating a two-dimensional image by rendering the three-dimensional map with an image capturing position of the sequentially acquired captured image as a viewpoint; and
combining pixels of the captured image whose three-dimensional position recognition is restricted, with the two-dimensional image.

15. A non-transitory computer readable medium having stored thereon a program that, when executed by processing circuitry, causes the processing circuitry to perform a method, comprising:
sequentially acquiring a two-dimensional captured image;
attaching, to each pixel of the sequentially acquired captured image, a label indicating a type of an object represented by the pixel, the label identifying the type of the object as being one of a first category and a second category;
dividing, by the processing circuitry, the sequentially acquired captured image into a plurality of regions; and
creating a three-dimensional map by executing three-dimensional position recognition for regions of the sequentially acquired captured image that include only pixels with labels indicating the type of the object as being of the second category, the three-dimensional position recognition not being performed on regions of the sequentially acquired captured image including pixels with labels indicating the type of the object as being of the first category,
wherein the method further includes
creating a two-dimensional image by rendering the three-dimensional map with an image capturing position of the sequentially acquired captured image as a viewpoint; and
combining pixels of the captured image whose three-dimensional position recognition is restricted, with the two-dimensional image.

* * * * *